A. B. COLLOM, L. E. McCLINTOCK, W. C. STEWART & R. R. McCREIGHT.
PAPER FOLDING MACHINE.
APPLICATION FILED APR. 7, 1908.
948,920.
Patented Feb. 8, 1910.
6 SHEETS—SHEET 5.
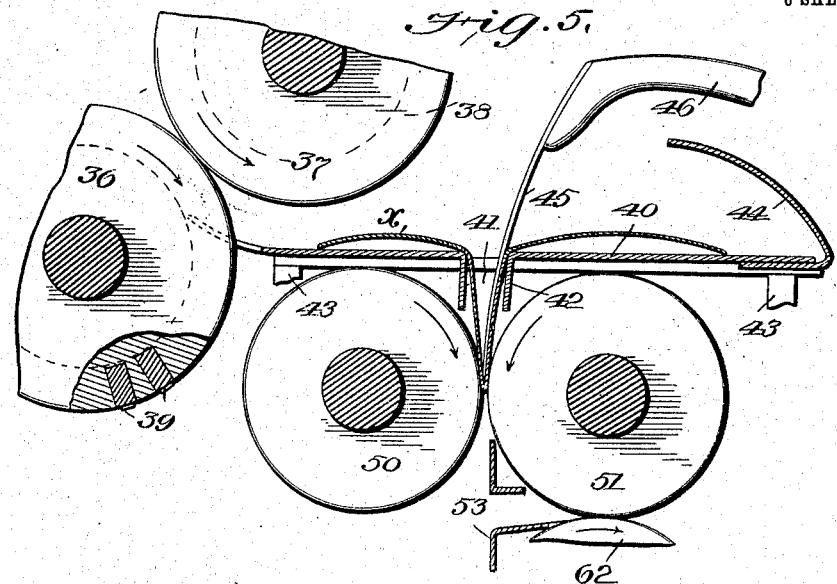
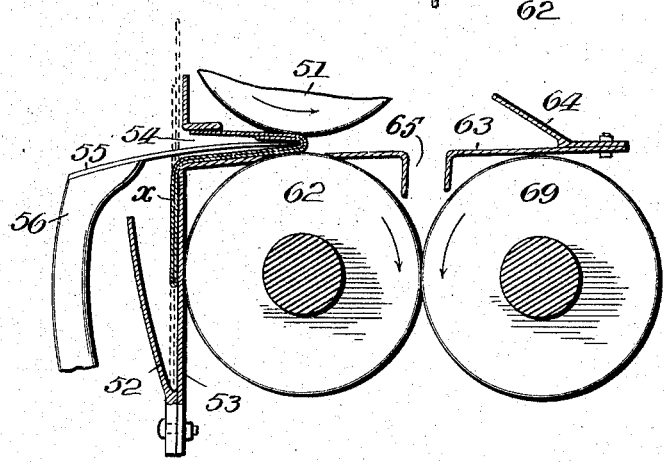
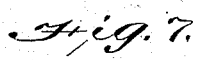
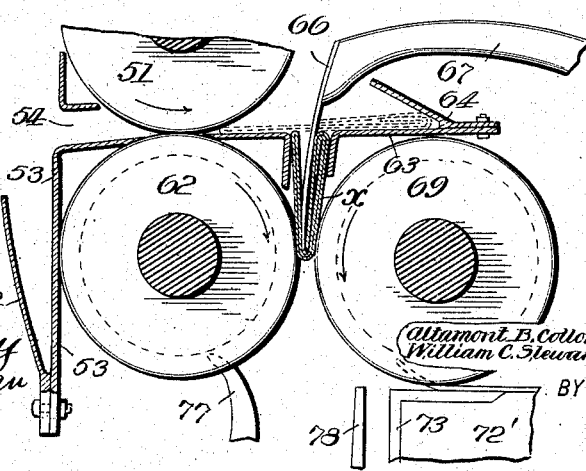
WITNESSES
F. C. Barry
E. M. Callaghan
INVENTORS
Altamont B. Collom, Louis E. McClintock
William C. Stewart, Robert R. McCreight
BY Munn & Co.
ATTORNEYS A. B. COLLOM, L. E. McCLINTOCK, W. C. STEWART & R. R. McCREIGHT.
PAPER FOLDING MACHINE.
APPLICATION FILED APR. 7, 1908.
948,920.
Patented Feb. 8, 1910.
6 SHEETS—SHEET 6.
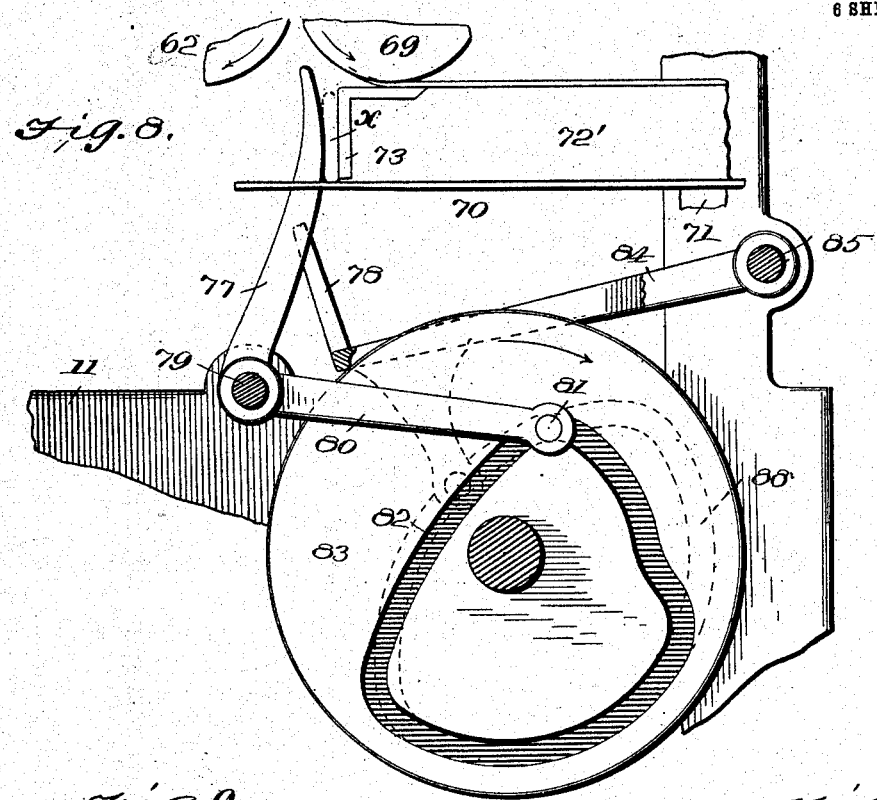
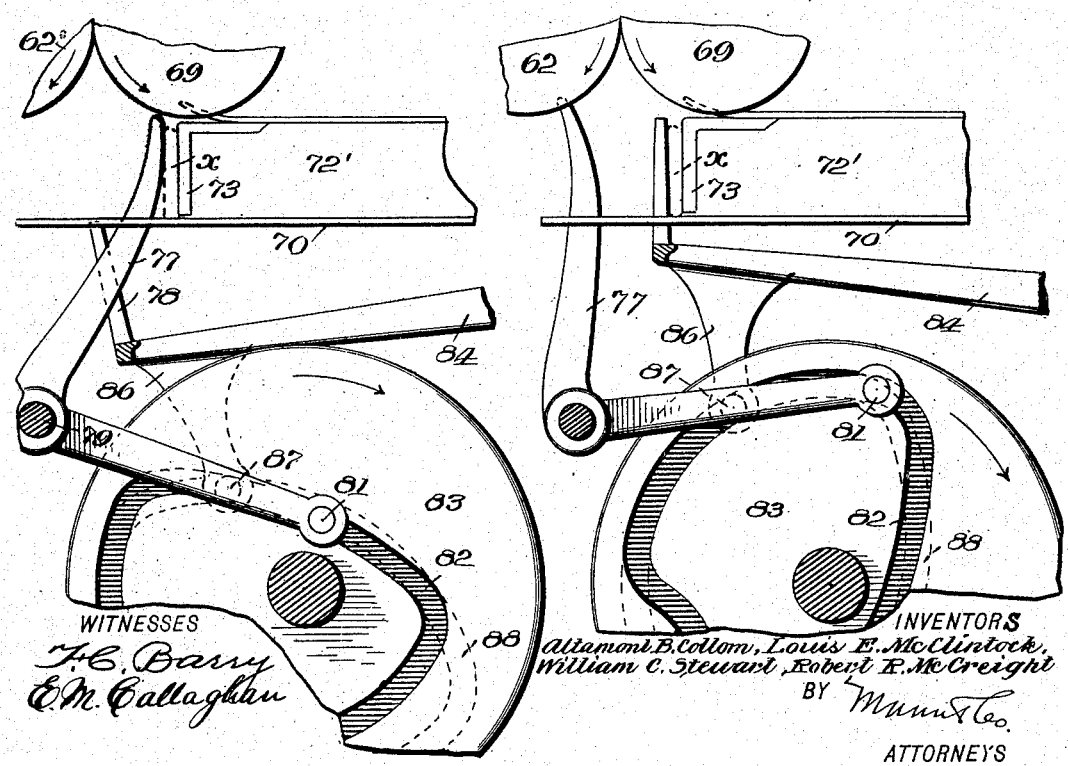

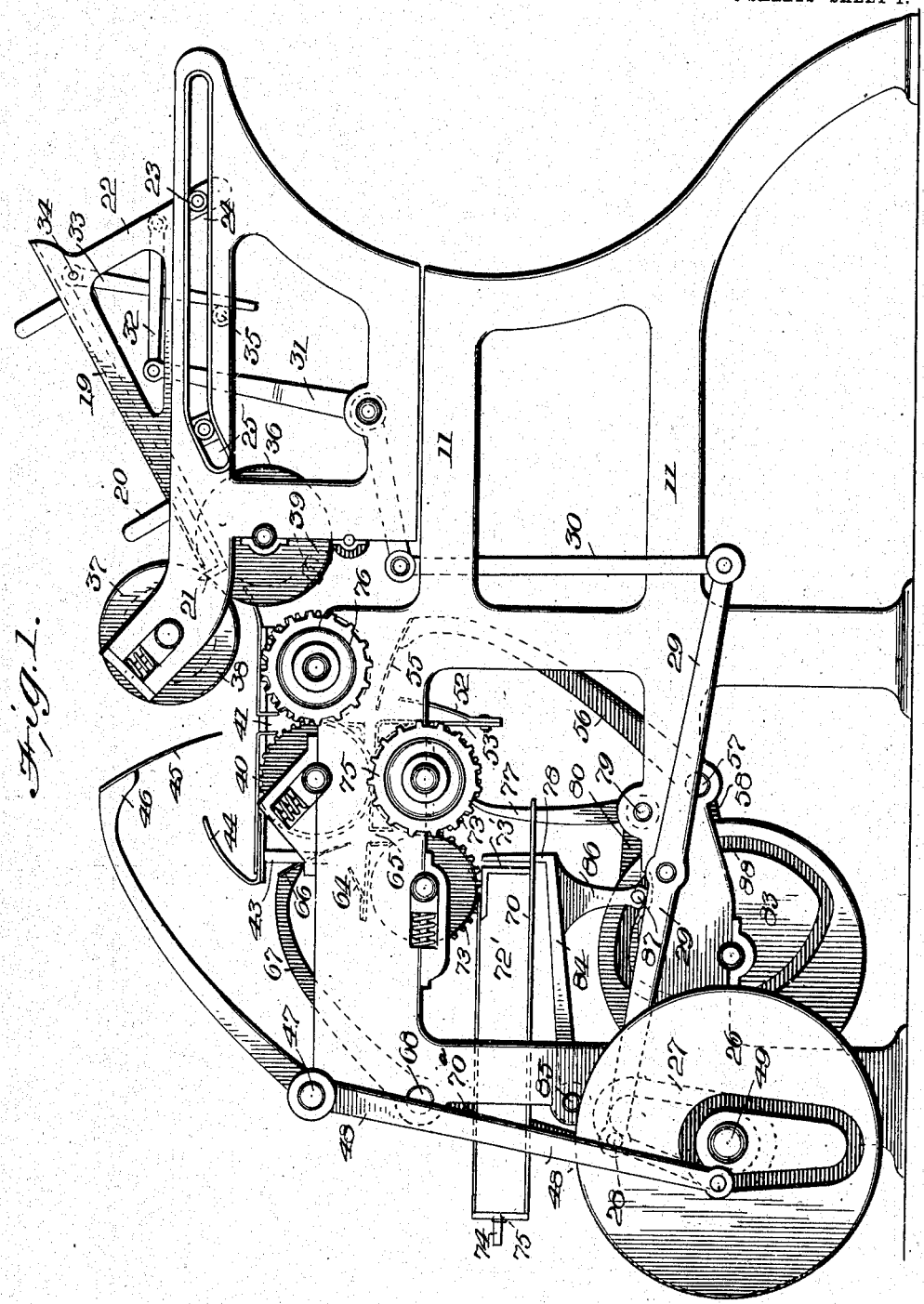

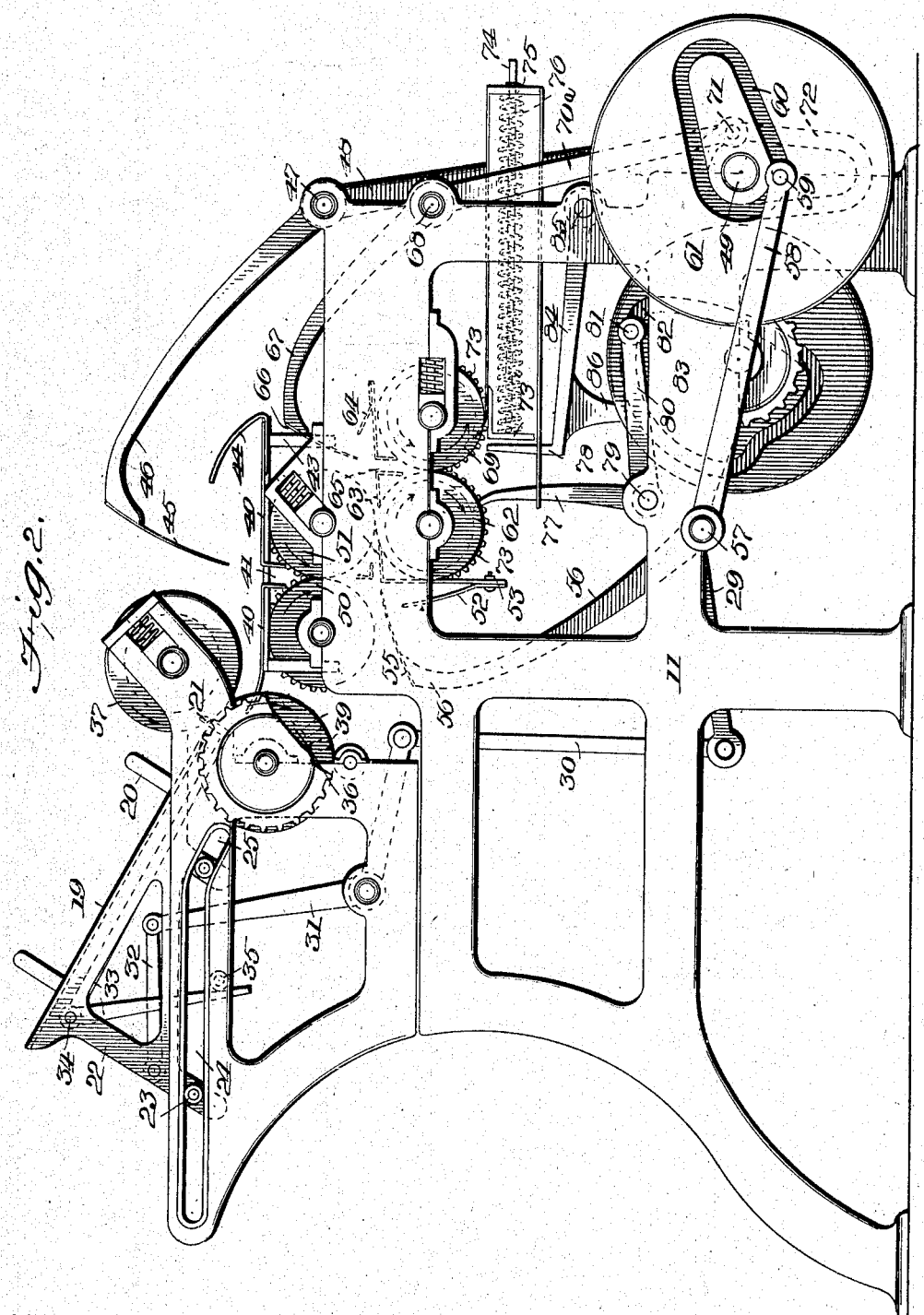

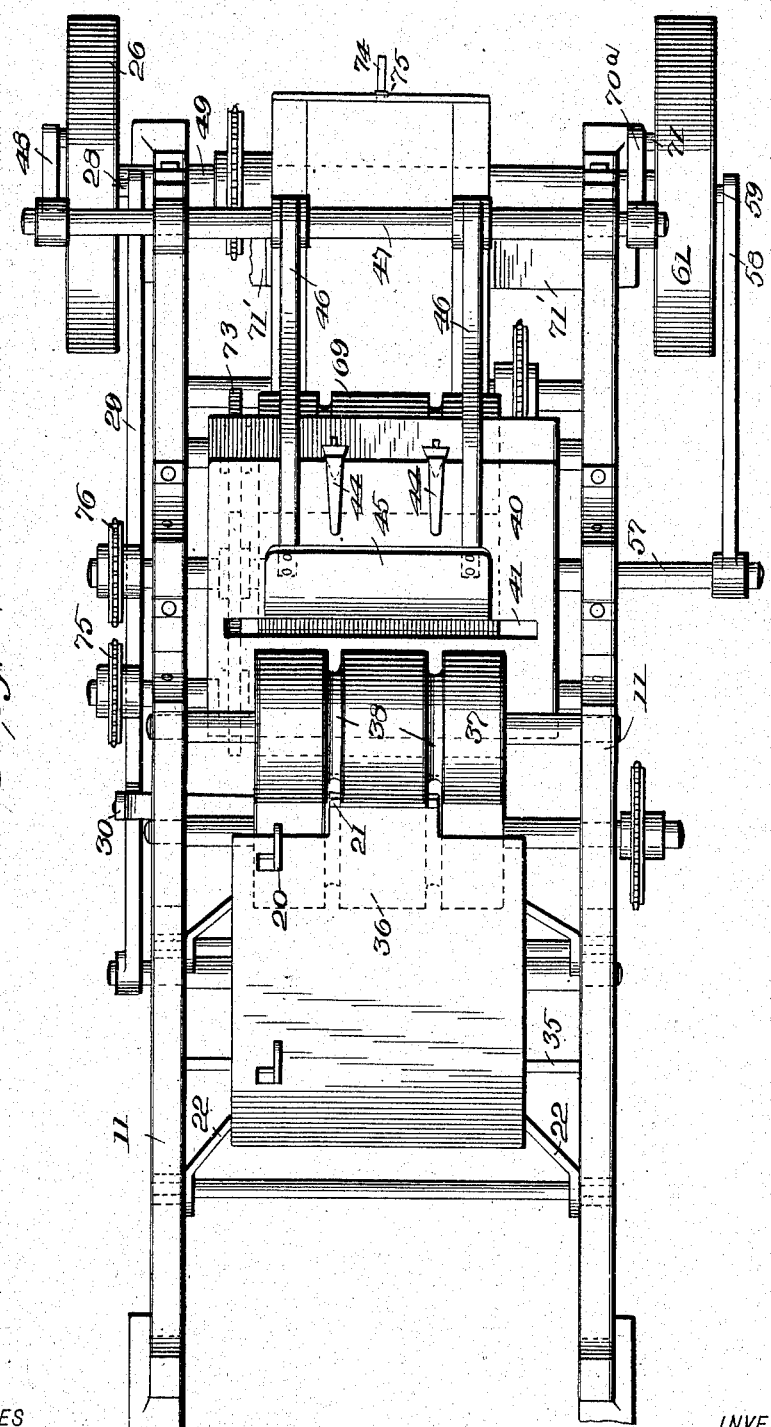

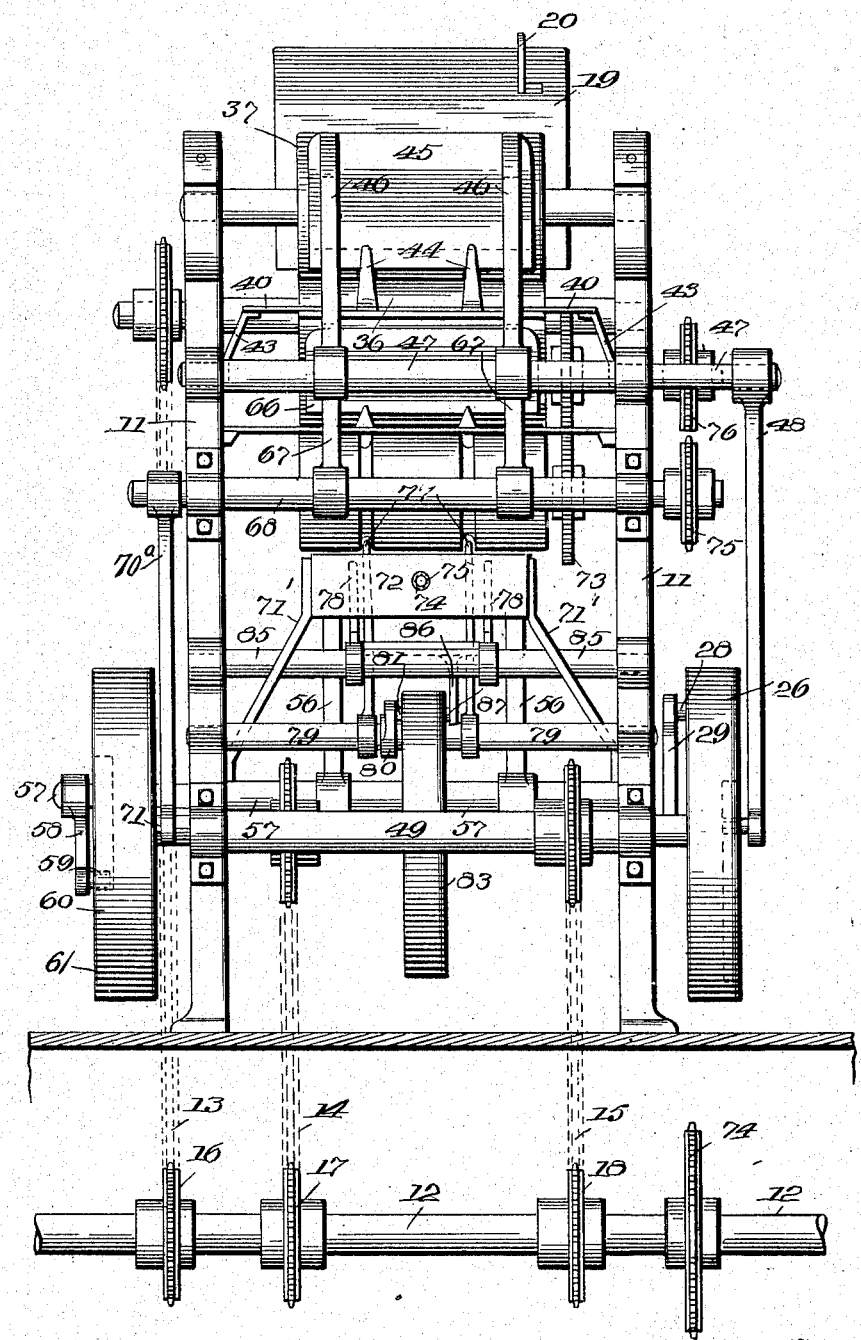

UNITED STATES PATENT OFFICE.

ALTAMONT B. COLLOM, LOUIS E. McCLINTOCK, WILLIAM C. STEWART, AND ROBERT R. McCREIGHT, OF MARISSA, ILLINOIS.

PAPER-FOLDING MACHINE.

948,920.   Specification of Letters Patent.   Patented Feb. 8, 1910.

Application filed April 7, 1908. Serial No. 425,611.

*To all whom it may concern:*

Be it known that we, ALTAMONT B. COLLOM, LOUIS E. MCCLINTOCK, WILLIAM C. STEWART, and ROBERT R. McCREIGHT, citizens of the United States, residing at Marissa, in the county of St. Clair and State of Illinois, have invented a new and useful Improvement in Paper-Folding Machines, of which the following is a specification.

This invention is a machine for folding paper, and it is particularly designed to prepare, by folding, or doubling, the tie sack and pouch labels used by postal and post office clerks. These labels are usually of standard size (5 1/4 x 3 3/16 inches) and before being used are folded three times, and have printed thereon the name of the clerk and the date on which used, as well as containing other printed information which, however, is general and may be printed in advance.

The present machine will fold the slips as stated, and print the name and date thereon, and deliver the folded labels in order to a receiving box. A novel feeding mechanism is also provided for automatic action.

The invention is illustrated in the accompanying drawings, in which—

Figure 1 is an elevation of one side of the machine. Fig. 2 is an elevation of the other side. Fig. 3 is a top plan. Fig. 4 is an elevation of the rear or delivery end. Figs. 5, 6 and 7 are enlarged sectional details showing the three successive folding actions. Figs. 8, 9, and 10 are enlarged details of the delivery devices and the cams operating the same.

The frame of the machine is indicated as a whole at 11, consisting of opposite side frames of proper size and shape to support the parts to be hereinafter described. The power is derived from a shaft 12 below the floor, by means of chain belts indicated in dotted lines at 13, 14 and 15, passing around sprockets 16, 17 and 18 respectively, on the shaft.

The feeding devices comprise an inclined table 19, having side gages 20 and end stops or gages 21. The table stands on legs 22 which are provided with rollers 23 which travel in slots 24 in the side frames, and at the rear or inner ends these slots are inclined as at 25 whereby the front end of the table is tilted down at the end of its run, to feed the slips between the printing rolls.

The table rides back and forth on its rollers, being operated by means of a cam 26 having a cam groove 27 which receives a pin and roller 28 on the end of a lever 29 which is connected by rod 30 to bent lever 31 the upper end of which is connected to the table leg by link 32 (see Fig. 1). The levers are suitably fulcrumed on the frame of the machine. The end gages 21 are carried at the ends of bent levers 33 the lower arms of which are arranged to strike a stop or cross bar 35 at or about the end of the advance of the table, whereby the levers (which are fulcrumed at 34 on the under side of the table) are turned and the gages 21 are depressed, allowing the feed rolls to take the slip or sheet from the table.

The lower feed roll 36 is driven by the chain 13 (Fig. 4) and coöperates with the upper feed roll 37. The latter is grooved as at 38, to allow space for the end gages 21, and the former has recesses to receive the logotypes or forms 39, to print the name of the clerk and the date, the roller 37 acting as the impression roll.

From the feed and printing rollers just described the sheet or slip X is passed to the first folding devices (Fig. 5) comprising a plate 40 slotted transversely as at 41 with flanges 42 turned down at the edges of the slot. The plate is supported by legs 43 secured to the side frames, and is provided at the rear end with adjustable stops 44. The first fold of the slip is produced by a curved blade or plate 45 carried at the ends of arms 46 projecting from a rock shaft 47. The plate works edgewise into and out of the slot 41 and is timed to fold the slip through the slot, as illustrated in Fig. 5. The rock shaft 47 is operated by the cam 26, having a cam groove in which runs a pin and roller on the end of the arm 48 projecting from the shaft. The shaft 49 of the cam 26 is driven by the belt 15, heretofore referred to.

The folding blade 45 passes the folded slip to a pair of rolls 50 and 51 whose meeting faces are in line vertically under the slot 41 and from these rolls the slip drops to adjustable stops 52 on a vertical plate 53 which has a horizontal cross slot 54 with flanged edge. The slip is given its second fold (Fig. 6) through this slot by a blade 55 carried at the ends of oscillating arms 56 projecting from a rock shaft 57 which is journaled on the side frames and is actuated by an arm 58 having a pin and roller 59 which runs in a groove 60 in cam 61 on the end of the shaft 49 opposite to the cam 26. The slip so folded through the slot 54 is passed between and flattened by the roll 51 coöperating with roll 62 and delivered onto a horizontal plate 63 and against adjustable stops 64 at the rear edge thereof. The plate 63 is slotted as at 65, and the slip is given its final fold through said slot (Fig. 7) by a blade 66 carried by arms 67 on a rock shaft 68, and the slip passes thence between the rollers 62 and 69 by which it is dropped to the delivery devices. The rock shaft 68 is operated by arm 70ª having a pin and roller 71 traveling in groove 72 on the inner side of cam 61.

The various flattening rolls are geared together as indicated by gears 73 to insure positive and uniform action, and may be driven by belts (not shown) between the sprocket 74 on the shaft 12 and sprockets 75 and 76 on the shafts of two of the rollers.

From the rolls 62 and 69 the folded labels fall edgewise onto the projecting bottom 70 of the delivery box 72′ which is supported by brackets 71′. Said box has a follower 73′ guided by a rod 74 which works through a hole 75 in the end of the box, and yieldingly supported by a spring 76 coiled around the rod. A pair of upright arms or fingers 77 work in slots in the projecting end of the bottom 70 and coöperate with a pair of fingers 78 which also work in slots therein. The fingers 77 oscillate toward and from the follower 73, as do the fingers 78. The former are mounted on a rock shaft 79 operated by an arm 80 having pin and roller 81 running in groove 82 in one side of a cam 83, and the latter fingers are carried at the ends of arms 84 projecting from rock shaft 85, the arms having a bracket 86 with pin and roller 87 running in groove 88 on the opposite side of cam 83, giving a lifting movement to the arms and the fingers 78.

In consequence of the shape of the cam grooves the fingers 77 and 78 in one position are spaced apart above the bottom 70 (see Fig. 10) and the folded label drops between them. The fingers 77 then swing rearwardly or toward the box 72 and the fingers 78 drop below the bottom 70, allowing the fingers 77 to press the label against the follower, compressing the coiled spring to the necessary extent. This is followed by the lift of the fingers 78 behind the label holding the same in advanced position while the fingers 77 swing away to receive the next label, whereby the labels are packed in a row in the box, ready for removal or delivery in orderly arrangement.

The various rock and cam shafts are mounted in bearings in the side frames and the cams are properly shaped and timed to produce the results indicated.

Although described in connection with postal labels, obviously the machine may be used in connection with work of other kind, with or without modification. No limitation is implied from the particular use or construction described.

We claim—

1. In a device of the class described, an angular plate comprising a horizontal and a vertical portion, a stop secured to the outer end of each of said portions, the horizontal portion having a transverse slot intermediate the stop and the junction of the horizontal and vertical portions of the plate, a pair of rollers below the slot, the plate in front of the slot being cut away to permit the passage of the peripheral surface of one of the rollers, a roller above the plate coöperating with said roller, a folding blade movable through the slot, and a folding blade movable over the angular portion of the plate and between the last named rollers.

2. In a device of the class described, an angular plate provided with a transverse slot, a pair of rollers below the slot, said plate being cut away on one side of the slot to permit the passage of the peripheral surface of one of the rollers, a roller coöperating with said last named roller, and folding blades coöperating with the rollers.

ALTAMONT B. COLLOM.
LOUIS E. McCLINTOCK.
WILLIAM C. STEWART.
ROBERT R. McCREIGHT.

Witnesses:
A. C. ELDER,
F. J. WAGNER.